(12) United States Patent
Scorgie

(10) Patent No.: US 11,940,866 B2
(45) Date of Patent: Mar. 26, 2024

(54) VERIFYING PROCESSING LOGIC OF A GRAPHICS PROCESSING UNIT

(71) Applicant: Imagination Technologies Limited, Kings Langley (GB)

(72) Inventor: Donald Scorgie, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/852,188

(22) Filed: Jun. 28, 2022

(65) Prior Publication Data

US 2023/0043280 A1   Feb. 9, 2023

(30) Foreign Application Priority Data

Jun. 29, 2021 (GB) ..................... 2109352

(51) Int. Cl.
*G06F 11/07* (2006.01)
*G06F 9/38* (2018.01)

(52) U.S. Cl.
CPC ........ *G06F 11/0724* (2013.01); *G06F 9/3836* (2013.01); *G06F 9/3877* (2013.01); *G06F 11/079* (2013.01)

(58) Field of Classification Search
CPC .. G06F 11/0724; G06F 11/079; G06F 9/3836; G06F 9/3877
See application file for complete search history.

(56) References Cited

U.S. PATENT DOCUMENTS

| 2016/0055047 | A1  | 2/2016 | Okamoto |
| 2021/0109813 | A1* | 4/2021 | Morris ............... G06F 11/0796 |
| 2021/0165730 | A1  | 6/2021 | Surya et al. |

FOREIGN PATENT DOCUMENTS

EP   3663921 A1   6/2020

* cited by examiner

*Primary Examiner* — Nadeem Iqbal
(74) *Attorney, Agent, or Firm* — Potomac Law Group, PLLC; Vincent M DeLuca

(57) ABSTRACT

A method of verifying processing logic of a graphics processing unit receives a test task including a predefined set of instructions for execution on the graphics processing unit, the predefined set of instructions being configured to perform a predetermined set of operations on the graphics processing unit when executed for predefined input data. In a test phase, the test task is processed by executing the predefined set of instructions for the predefined input data first and second times at the graphics processing unit so as to, respectively, generate first and second outputs. A fault signal is raised if the first and second outputs do not match.

15 Claims, 3 Drawing Sheets

VERIFYING PROCESSING LOGIC OF A GRAPHICS PROCESSING UNIT

BACKGROUND

The present disclosure relates to a graphics processing unit and a method of verifying processing logic of a graphics processing unit.

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Data processing devices often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, data processing devices for safety-critical systems comprise a processor running software. Both the hardware and software elements must meet specific safety goals.

Software failures are typically systematic failures due to programming errors or poor error handling. For software, the safety goals are typically achieved through rigorous development practices, code auditing and testing protocols.

For the hardware elements of a data processing device, such as processing units, safety goals may be expressed as a set of metrics, such as a maximum number of failures in a given period of time (often expressed as Failures in Time, or FIT), and the effectiveness of mechanisms for detecting single point failures (Single Point Failure Mechanisms, or SPFM) and latent failures (Latent Failure Mechanisms, or LFM). It is important that data processing hardware is designed to handle some level of errors because, even if systematic errors could be completely excluded from a safety-critical system, random errors can be introduced into hardware, e.g. by transient events (e.g. due to ionizing radiation, voltage spikes, or electromagnetic pulses). In binary systems transient events can cause random bit-flipping in memories and along the data paths of a processor. There are various approaches to achieving safety goals in data processing hardware: for example, by providing redundancy so that if one component fails another is available to perform the same task, or through the use of check data (e.g. parity bits or error-correcting codes) to allow the hardware to detect and/or correct for minor data corruptions.

For example, data processors can be provided in a dual lockstep arrangement 100 as shown in FIG. 1 in which a pair of identical processing units 101 and 102 are configured to process a stream of instructions 103 in parallel. The processing units 101 and 102 are typically synchronised for each stream of instructions such that the two processing units 101 and 102 execute that stream of instruction cycle-by-cycle, concurrently. The output of either one of the processing units 101, 102 may be used as the output 104 of the lockstep processor. When the outputs of the processing units 101 and 102 do not match, a fault can be raised to the safety-critical system. However, since a second processing unit is required, dual lockstep processors necessarily consume double the chip area compared to conventional processors and consume approximately twice the power.

Advanced driver-assistance systems and autonomous vehicles may incorporate data processing devices that are suitable for such safety-critical applications which have significant graphics and/or vector processing capability, but the increases in the area and power consumption (and therefore cost) of implementing a dual lockstep processor might not be acceptable or desirable.

For example, driver-assistance systems often provide computer-generated graphics illustrating hazards, lane position, and other information to the driver. Typically this will lead the vehicle manufacturer to replace a conventional instrument cluster with a computer-generated instrument cluster which also means that the display of safety-critical information such as speed and vehicle fault information becomes computer-generated. Such processing demands can be met by graphics processing units (GPUs). However, in the automotive context, advanced driver-assistance systems typically require a graphics processing unit which meets ASIL level B of ISO 26262.

Autonomous vehicles must in addition process very large amounts of data (e.g. from RADAR, LIDAR, map data and vehicle information) in real-time in order to make safety-critical decisions hundreds of times a second. Graphics processing units can also help meet such processing demands but safety-critical systems in autonomous vehicles are typically required to meet the most stringent ASIL level D of ISO 26262.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect there is provided a method of verifying processing logic of a graphics processing unit, the method comprising: receiving a test task at the graphics processing unit, the test task comprising a predefined set of instructions for execution on the graphics processing unit, the predefined set of instructions being configured to perform a predetermined set of operations on the graphics processing unit when executed for predefined input data; in a test phase, processing the test task by executing the predefined set of instructions for the predefined input data first and second times at the graphics processing unit so as to, respectively, generate first and second outputs; and raising a fault signal if the first and second outputs do not match.

The predefined set of instructions may be configured to perform a different predetermined set of operations on the graphics processing unit when executed for different predefined input data.

The graphics processing unit may comprise a plurality of processing elements, and the method comprises processing the test task first and second times, respectively, at different processing elements of the graphics processing unit.

Raising a fault signal if the first and second outputs do not match may comprise: forming first and second signatures which are characteristic of, respectively, the first and second outputs; comparing the first and second signatures; and raising a fault signal if the first and second signatures do not match.

Forming first and second signatures which are characteristic of, respectively, the first and second outputs may comprise determining one or more of a checksum, a cyclic redundancy check, a hash and a fingerprint over, respectively, the first and second outputs.

The method may not comprise receiving a predetermined expected output of the test task.

The method may further comprise: receiving one or more non-test tasks for processing at the graphics processing unit; and in a non-test phase, processing each non-test task at the graphics processing unit a single time so as to generate a non-test output.

Each non-test task may comprise a set of instructions defining a portion of work for the graphics processing unit to perform.

The work for the graphics processing unit to perform may comprise one or more of image processing, video processing, graphics processing and/or general processing.

The work for the graphics processing unit to perform may be safety-critical work.

The method may further comprise alternating between the test phase and the non-test phase.

The method may further comprise: when entering the test phase from the non-test phase, pausing processing of a non-test task so that the processing of the test task can begin; and when re-entering the non-test phase from the test phase, resuming processing of the paused non-test task.

The method may further comprise operating in the test phase for x % of the time, and operating in the non-test phase for (100−x) % of the time.

x may be adaptive. x may be adaptive in dependence on the number of fault signals raised in a preceding period of time. x may be adaptive in dependence on an indicated safety-criticality of the non-test tasks to be processed by the graphics processing unit in the non-test phase.

The method may further comprise, if the number of fault signals raised in a preceding period of time exceeds a threshold: in the non-test phase, processing a non-test task first and second times at the graphics processing unit so as to, respectively, generate first and second non-test outputs; and raising a fault signal if the first and second non-test outputs do not match.

The method may further comprise: writing out the first non-test output to a memory; reading back the first non-test output from the memory; and raising a fault signal if the first non-test output as read back from the memory and the second non-test output do not match.

The test task may be configured such that the processing of that test task by executing the predefined set of instructions for the predefined input data first and second times at the graphics processing unit uses y % of the logic on the graphics processing unit.

The method may further comprise: receiving a plurality of predefined input data; and the test task may be configured such that the processing of that test task by executing the predefined set of instructions for each of the plurality of predefined input data first and second times at the graphics processing unit cumulatively uses y % of the logic on the graphics processing unit.

The method may further comprise: receiving a predefined set of test tasks, each test task comprising a predefined set of instructions for execution on the graphics processing unit, the predefined set of instructions being configured to perform a predetermined set of operations on the graphics processing unit when executed for predefined input data; and the predefined set of test tasks may be configured such that the processing of each test task of the predefined set of test tasks by executing the respective predefined set of instructions for the respective predefined input data first and second times at the graphics processing unit cumulatively uses y % of the logic on the graphics processing unit.

y may be greater than or equal to 90.

The method may further comprise: scheduling a plurality of resets of the graphics processing unit in accordance with a reset frequency; and causing the plurality of resets of the graphics processing unit to be performed commensurate with the reset frequency; and the reset frequency may be dependent on the number of fault signals raised in a preceding period of time.

According to a second aspect there is provided a graphics processing unit comprising processing logic and a check unit: the graphics processing unit being configured to receive a test task comprising a predefined set of instructions for execution on the graphics processing unit, the predefined set of instructions being configured to perform a predetermined set of operations on the graphics processing unit when executed for predefined input data; the processing logic being configured to, in a test phase, process the test task by executing the predefined set of instructions for the predefined input data first and second times at the graphics processing unit so as to, respectively, generate first and second outputs; and the check unit being configured to raise a fault signal if the first and second outputs do not match.

The processing logic may comprise a plurality of processing elements, and the processing logic being configured to process the test task first and second times, respectively, at different processing elements.

According to a third aspect there is provided a processing system comprising the graphics processing unit as described herein, wherein the graphics processing unit receives the test task from the processing system.

A graphics processing unit as described herein may be embodied in hardware on an integrated circuit. There may be provided a method of manufacturing, at an integrated circuit manufacturing system, a graphics processing unit as described herein. There may be provided an integrated circuit definition dataset that, when processed in an integrated circuit manufacturing system, configures the system to manufacture a graphics processing unit as described herein. There may be provided a non-transitory computer readable storage medium having stored thereon a computer readable description of a graphics processing unit as described herein that, when processed in an integrated circuit manufacturing system, causes the integrated circuit manufacturing system to manufacture an integrated circuit embodying the graphics processing unit as described herein.

There may be provided an integrated circuit manufacturing system comprising: a non-transitory computer readable storage medium having stored thereon a computer readable description of a graphics processing unit as described herein; a layout processing system configured to process the computer readable description so as to generate a circuit layout description of an integrated circuit embodying the graphics processing unit as described herein; and an integrated circuit generation system configured to manufacture the graphics processing unit as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
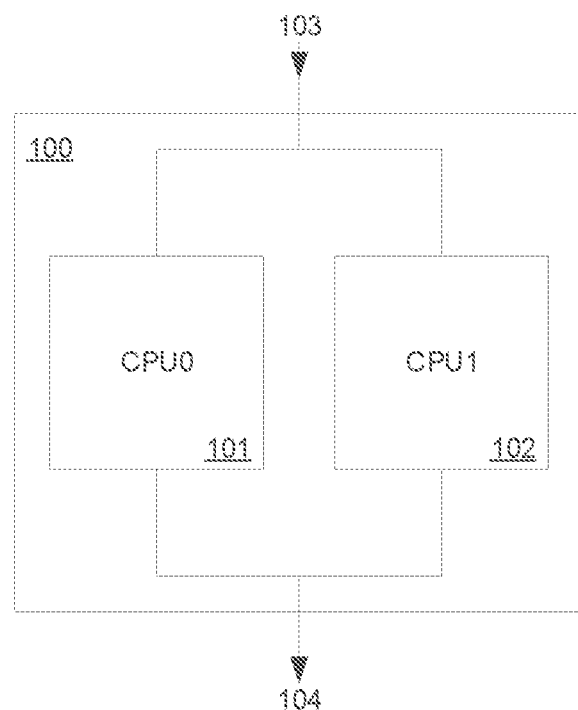
FIG. 1 shows a conventional dual lockstep processor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

The present disclosure relates to a graphics processing unit (GPU) and a method of verifying a graphics processing unit. A graphics processing unit configured in accordance with the principles herein may have any suitable architecture. A graphics processing unit configured in accordance with the principles herein may be operable to perform any kind of graphics, image or video processing, general processing and/or any other type of data processing—such as the processing of general computing tasks, particularly those which can be readily parallelised. Examples of general computing tasks include signal processing, audio processing, computer vision, physical simulations, statistical calculations, neural networks and cryptography.

Figure 2:
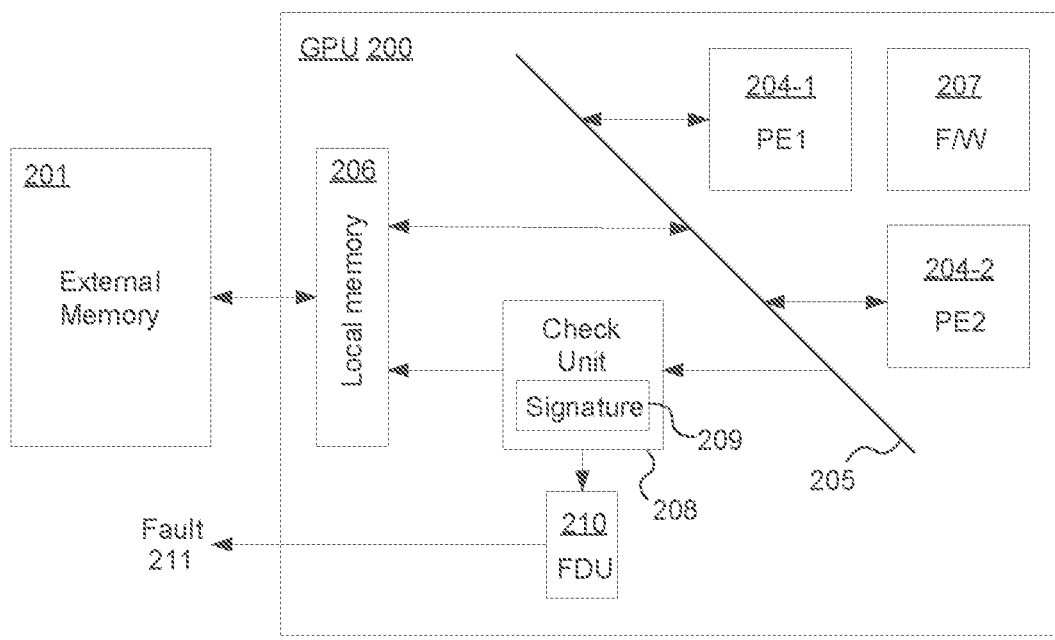
FIG. 2 shows a graphics processing unit.

FIG. 2 shows an example graphics processing unit (GPU) 200. Graphics processing unit 200 comprises processing logic, which includes one or more processing elements. Graphics processing unit 200 comprises a plurality of processing elements 204, labelled in FIG. 2 as PE1 204-1 and PE2 204-2. Processing elements 204 may be, for example, any kind of graphical and/or vector and/or stream processing elements Each processing element 204 may be a different physical core of the graphics processing unit. Graphics processing unit 200 is shown in FIG. 2 as comprising two processing elements, however it is to be understood that a graphics processing unit configured in accordance with the principles described herein could comprise any suitable number of processing elements 204. Graphics processing unit 200 may include local memory 206 (e.g. including one or more buffers, caches, and/or registers) configured to receive data from an external memory 201, and provide processed data to the external memory 201. External memory 201 may comprise one or more data storage units arranged in any suitable manner. Typically, external memory 201 would comprise a memory dedicated to the graphics processing unit and a system memory of the processing system at which the graphics processing unit is supported.

The various units of graphics processing unit 200 may communicate over one or more data buses and/or interconnects 205. The graphics processing unit 200 may comprise firmware 207—for example to provide low-level control of the units of the graphics processing unit.

The processing elements 204 of the graphics processing unit 200 are operable to process tasks. A task may be any portion of work received at the GPU for processing at a processing element. For example, a task may comprise a set of instructions for execution on the graphics processing unit, those instructions defining one or more processing operations to be performed on any kind of data which the processing elements of the graphics processing unit 200 may be configured to process, such as vector data. Graphics processing unit 200 may be configured to operate on a plurality of different types of task. In some architectures, different processing elements or groups of processing elements may be allocated to process different types of task.

The processing elements 204 may be arranged such that each processing element can perform a respective task at the same time. In this manner the graphics processing unit 200 can concurrently process a plurality of tasks. Each processing element 204 may comprise a plurality of configurable functional elements (e.g. shaders, geometry processors, vector processors, rasterisers, texture units, etc.) so as to enable a given processing element to be configured to perform a range of different processing operations. The functional elements of a processing element 204 can be configured so as to form specialised processing pipelines—such as integer pipelines, or floating point pipelines. A processing element 204 may be configured by means of, for example, a software driver of the graphics processing unit 200 passing appropriate commands to firmware 207 so as to enable/disable the functional elements of the processing element so as to cause the processing element to perform different sets of processing actions. In this manner, a processing element 204 may be configured to, for example, perform vector processing of sensor data received from vehicular sensors, while another processing element 204 may be configured to, for example, perform shader processing on graphical tasks representing part of a computer-generated image of a scene (e.g. a tile). Each processing element 204 may be able to process tasks independently of any other processing element 204. Therefore, a task processed at one processing element 204 may not cooperate with another processing element 204 in order to process that task (e.g. an individual task may not be processed in parallel at more than one processing element 204, although an individual task could be processed in parallel at a single processing element 204).

On processing a task, a processing element 204 generates an output in respect of that task. The output data may be a final output for the processing of that task, or intermediate output data generated during the processing of that task. Data output by processing elements may be output directly to memory (e.g. to local memory 206, to external memory 201 via local memory 206, or directly to external memory 201). Alternatively, or additionally, data output by processing elements may be output to check unit 208.

Check unit 208 is operable to receive output data from a processing element 204 and form a signature which is characteristic of that output data. For example, the signature may be characteristic of the output data as output from a processing element 204. In other words, the signature may be characteristic of the output data at the point it is output from a processing element 204. The check unit may determine, for example, a checksum, hash, cyclic redundancy check (CRC), or fingerprint calculation on the output data. The check unit may operate on data generated by a processing element 204 processing a task. Said data may include memory addresses and/or control data associated with that generated data—this can help the validation operations described herein to identify a wider range of faults. The signature provides an expression of the processing performed on a task by a processing element 204 in a more compact form than the output data itself so as to facilitate comparison of the output data provided by different processing elements 204. Preferably the check unit forms a signature over all of the output data (which might not include any control data) received from a processing element 204 in respect of a task, but the signature could be formed over some (e.g. not all) of the output data received from a processing element 204 in respect of a task.

The check unit 208 may comprise a data store 209 for storing one or more signatures formed at the check unit. Alternatively, or additionally, the check unit may make use of a data store external to the check unit (e.g. at local memory 206 of the graphics processing unit 200) for storing one or more signatures formed at the check unit. The check unit may receive output data from all or a subset of the processing elements 204 of the graphics processing unit 200. The check unit may comprise a plurality of check unit instances—for example, each check unit instance may be configured to receive output data from a different subset of processing elements 204 of the graphics processing unit 200.

Graphics processing unit 200 further comprises a fault detection unit 210 which is configured to compare two or more signatures formed at the check unit 208. The fault detection unit 210 is configured to raise a fault signal 211 on determining that signatures do not match. A fault could potentially lead to a safety violation at the graphics processing unit 200. The fault signal may be provided in any suitable manner as an output of the graphics processing unit 200. For example, the fault signal may be one or more of: control data; an interrupt; data written out to external memory 201; and data written to local memory 206 or a system to which the graphics processing unit 200 is connected.

The fault detection unit 210 is configured to compare the signatures of output data from processing elements 204 arranged to process the same task. A task may be processed multiple times (e.g. twice) by one or more processing elements 204. The processing performed by the processing element(s) 204 for processing the task multiple times may or may not be concurrent. If two processing elements 204 are arranged to process the same task, comparing the signatures characteristic of the output data as output from the processing elements 204 indicates whether the processing performed by the pair of processing elements 204 is in agreement. When the signatures of a pair of processing elements 204 in respect of a given task do not match, the fault signal 211 indicates that a fault occurred at one of the processing elements 204.

If a task is processed three or more times (e.g. by a group of three or more processing elements arranged to process the task), comparing the signatures characteristic of the output data from the processing elements which process the task indicates whether the processing performed by the processing elements is in agreement. In this example, when the three or more signatures determined from the processing of the task do not match, the fault signal 211 indicates that a fault occurred at one of the processing elements and it can further indicate at which one of the processing elements the fault occurred. This is because the fault can be assumed to have occurred at the processing element whose signature does not match the signatures of the outputs from the two or more other processing elements.

Figure 3:
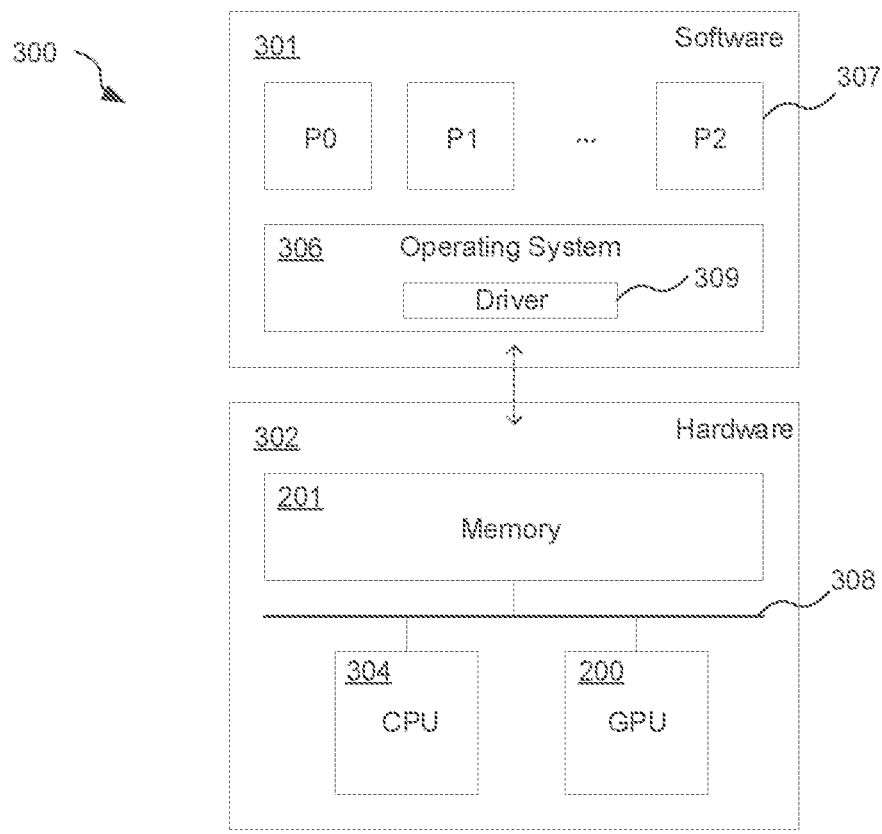
FIG. 3 shows a processing system comprising a graphics processing unit.

The graphics processing unit 200 can be incorporated into a processing system, such as processing system 300 shown in FIG. 3. Processing system 300 may comprise other processors, such as a central processing unit (CPU) 304. Processing system 300 comprises memory 201 (e.g. external memory 201 shown in FIG. 2). The hardware 302 may comprise one or more data buses and/or interconnects 308 over which the processors 200, 304 and memory 201 may communicate. Typically, a software environment 301 is provided at the processing system in which a plurality of processes 307 may execute. An operating system 306 may provide an abstraction of the available hardware 302 to the processes 307. The operating system may include a driver 309 for the graphics processing unit 200 so as to expose the functionalities of the graphics processing unit 200 to the processes. This enables the system to send tasks to the graphics processing unit 200. For example, tasks may be sent to the graphics processing unit 200 by a process 307 running on a central processing unit 304. All or part of the software environment 301 may be provided as firmware. In an example, the processing system 300 forms part of a vehicle control system, with the processes each performing one or more control functions of the vehicle, such as instrument cluster display, entertainment system, engine management, climate control, lane control, steering correction, automatic braking systems, etc. One or more of the processes 307 may be safety-critical processes. The processes may be a mix of safety-critical processes which must be executed according to a predefined safety level and non-safety-critical processes which do not need to be executed according to a predefined safety level.

A fault signal may be used in any manner by a processing system 300 in which the graphics processing unit 200 is incorporated. For example, on a fault signal being raised by the fault detection unit, the system in which the graphics processing unit 200 is incorporated may discard output data formed in respect of the subject task, cause the task to be resubmitted to the graphics processing unit 200 for reprocessing, log fault signals so as to generate fault statistics, shut the graphics processing unit 200 down and fall back to a simplified rendering mechanism in trusted hardware (e.g. CPU rendering only), and/or enact a safety process for the graphic processing unit (e.g. cause a hardware reset of the graphic processing unit). The graphics processing unit 200 may itself use the fault signal 211. For example, the graphics processing unit 200 may log fault signals so as to generate and report fault statistics to processing system 300.

Graphics processing unit 200 as shown in FIG. 2 may be operable to process tasks so as to meet a predefined safety level. For example, the graphics processing unit 200 may be certified to meet the ASIL B or ASIL D standards of ISO 26262. Tasks which require processing to the predefined safety level may be tasks relating to safety-critical functions of a processing system 300 into which the graphics processing unit 200 may be incorporated. For example, in an automotive application, tasks which are safety-critical may be those tasks relating to the image processing of data captured by one or more vehicle cameras for use in a lane assist system. Thus, a method of verifying a graphics processing unit 200 is desirable. That is, it is desirable to be able to verify that graphics processing unit 200 is functioning correctly (e.g. as expected).

It is known to perform predefined programs (e.g. sets of instructions) on general processing hardware (e.g. a CPU) so as to verify that general processing hardware. The set of instructions can be executed for predefined input data, and the output data can be compared to predetermined (e.g. expected) output data. If the output data matches the predetermined (e.g. expected) output data, it can be determined that the general processing hardware is functioning correctly. Pre-defined programs such as these may be referred to as software test libraries (STLs), and represent an approach to testing that involves providing particular, specially designed, tasks as stimuli to a component to see if the component provides an expected result.

An STL is specifically designed for the hardware it is to verify so as to use certain parts of, or traverse certain pathways through, that hardware. For example, an STL may require a specific set of data manipulation operations to be performed to target a specific set of logic, or may specify a set of reads/writes to be performed to target certain pathways to/from memory. An STL verifies the subset of the logic on a hardware arrangement that it is programmed to use. That is, an STL can verify that the specific set of logic that it is programmed to use is functioning correctly. Any other logic on that hardware that the STL is not programmed to use cannot verified by the use of that STL. Thus, it is important to design an STL to utilise enough of the available logic on a hardware arrangement (e.g. a CPU) so as to satisfactorily verify that hardware arrangement. Different STLs are designed for different hardware arrangements. That is, the specific predefined program (e.g. set of instructions) defining an STL vary depending on the hardware arrangement to be verified.

To the applicant's knowledge, STLs have not previously been used to verify graphics processing units. This is because it was previously thought—as the logical elements of a graphics processing unit are configurable in such a large number of different permutations, e.g. so as to implement many different specialised processing pipelines; and as graphics processing units (unlike typical general processing hardware, such as CPUs) permit parallelised processing, e.g. the execution of single input, multiple data (SIMD) instructions—that the number of possible logical pathways to verify using an STL would be too vast. These factors have previously prevented those skilled in the art from (i) designing predefined programs (e.g. sets of instructions) that utilise enough of the available logic on a graphics processing unit so as to satisfactorily verify that graphics processing unit, and (ii) calculating expected output data for those programs.

Figure 4:
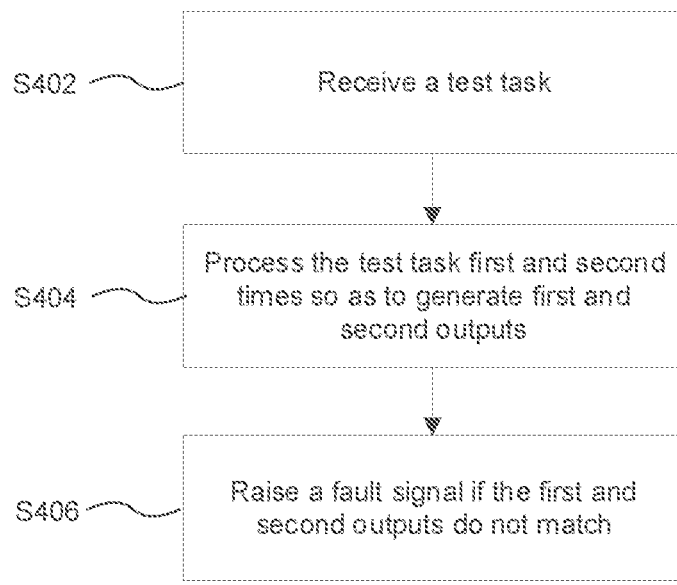
FIG. 4 shows a method of verifying a graphics processing unit in accordance with the principles described herein.

FIG. 4 shows a method of verifying a graphics processing unit in accordance with the principles described herein.

In step S402, a test task is received. The test task may be received at the graphics processing unit from a memory external to the graphics processing unit (e.g. external memory 201). For example, the test task may be generated by a process executing at the processing system at which the graphics processing unit is implemented (e.g. one of processes 307 shown in FIG. 3), and received at the graphics processing unit for processing (e.g. by being written into graphics processing unit 200 via operating system 306 and memory 201). The test task may be received at the graphics processing unit in real-time (e.g. during use of the graphics processing unit).

The test task is to be used to verify the graphics processing unit. The test task comprises a predefined set of instructions for execution on the graphics processing unit. The predefined set of instructions are configured to perform a predetermined set of operations on the graphics processing unit when executed for predefined input data. The predefined input data may also be received in step S402 (e.g. received in real-time, or pre-stored at the graphics processing unit). For example, the test task may require a specific set of data manipulation operations to be performed to target a specific set of logic on the graphics processing unit, or may specify a set of reads/writes to be performed to target certain pathways to/from memory. The predefined set of instructions may be configured to perform a different predetermined set of operations on the graphics processing unit when executed for different predefined input data.

In step S404, the test task is processed by executing the predefined set of instructions for the predefined input data first and second times at the graphics processing unit so as to, respectively, generate first and second outputs. Step S404 is performed in a test phase. The processing of a task first and second times may be termed redundant processing. The test task may be duplicated so as to form a first test task instance and a second test task instance to be processed. Duplicating the test task may comprise creating a copy of that test task. For example, the test task may be used as the first test task instance, and the second test task instance may be defined by a copy of each instruction or line of code defining the first test task instance. In another example, duplicating the test task may comprise invoking the test task for processing twice (e.g. without creating a copy of the test task). That is, a test task may be defined by a program stored in memory (e.g. external memory 201 and/or local memory 206). The test task can be invoked for processing by providing a processing element with a reference to that program in memory. Thus, the test task can be duplicated by providing that reference to memory to the processing element that is to process the first test task instance, and providing the same reference to memory to the processing element that is to process the second test task instance.

In step S406, a fault signal is raised if the first and second outputs do not match. That is, the method does not comprise receiving and/or comparing to a predetermined expected output of the test task. Instead, the first and second outputs generated by processing the test task first and second times at the graphics processing unit are compared to one another. If the first and second outputs do match then it can be considered that the graphics processing unit is functioning correctly (e.g. as expected).

Step S404 may be performed using check unit 208, as described herein with reference to FIG. 2. That is, first and second signatures may be formed which are characteristic of, respectively, the first and second outputs. As described herein, forming a signature characteristic of the first and second outputs may comprise performing one or more of a checksum, CRC, a hash and a fingerprint over, respectively, that output. Preferably the check unit forms a signature over all of the output data (which may include any referenced memory addresses) received from a processing element in respect of a task, but the signature could be formed over some (e.g. not all) of the output data received from a processing element in respect of a task. The first and second signatures may be compared, and a fault signal raised if the first and second signatures do not match. The formation and comparison of signatures, such as checksums, to compare the first and second outputs as described herein can advantageously reduce the overhead (e.g. memory and/or processing resource requirements) associated with performing that comparison, relative to comparing the first and second outputs themselves.

The method of verifying a graphics processing unit as described with reference to FIG. 4 is advantageous for numerous reasons. First, there is no need to predetermine an expected output for the test task—which, as described herein, has previously prevented those skilled in the art from using test tasks in this context. This is because the first and second outputs generated by processing the test task first and second times, respectively, at the graphics processing unit are compared to one another—rather than to an expected output. Second, the input data for which the predefined set of instructions of the test task is executed can be varied so as to use different logic on the graphics processing unit. This enables the same test task (e.g. predefined set of instructions) to be used to verify more logic on the graphics processing unit than if that test task always needed to be performed with the same input data. This is because, again, the output of the test task is not being compared to a predetermined expected output. Thus, the input data can be freely varied so as to target different logic and, so long as the same input data is used when the test task is processed first and second times, the resulting first and second outputs can be compared so as to verify that logic. It being possible to vary the input data is also advantageous because the input data can be tailored to make the processing of the test task more relevant to (e.g. similar to) the "normal" work expected to be performed by the graphics processing unit.

Different test tasks according to the principles described herein can be designed for different graphics processing units. That is, the specific predefined set of instructions defining the test task can vary depending on the hardware arrangement and capabilities of the graphics processing unit to be verified. A skilled person (e.g. a software engineer) would be capable of designing, on instruction, an appropriate test task according to the principles described herein that is suitable for the graphics processing unit to be verified.

In an example, the test task may be processed first and second times, respectively, at different processing elements of the graphics processing unit. For example, with reference to FIG. 2, the test task may be processed for a first time at processing element PE1 204-1, and processed for a second time at processing element PE2 204-2. This approach can be advantageous because the amount of logic (e.g. the number of possible logical pathways) to be verified by the test task is effectively halved. That is, the test task need only be capable of verifying the logic at one of those processing elements (e.g. cores)—because the test task will be performed at both. This means that the design of an appropriate test task that utilises enough of the available logic on a graphics processing unit so as to satisfactorily verify that graphics processing unit can be significantly less arduous.

Alternatively, as described herein, a graphics processing unit may comprise more than two processing elements. In these examples, the processing elements of a graphics processing unit may be divided into two groups. For example, these groups may be referred to as mission and safety groups. The test task may be processed by both the first (e.g. mission) group and the second (e.g. safety) group. The test task may be duplicated at each processing element in each group (i.e. so every processing element performs the same work), or may be divided amongst the processing elements in the first group and divided in the same way amongst the processing elements in the second group (i.e. so processing elements within a group perform different work, but for each processing element in the first group there is a respective processing element in the second group performing the same work). First and second outputs from respective processing elements of the first and second groups may be paired for comparison. For example, a graphics processing unit may comprise four processing elements labelled 1, 2, 3 and 4. The mission group may comprise processing elements 1 and 2. The safety group may comprise processing elements 3 and 4. The test task may be processed for a first time at processing elements 1 and 2. The test task may be processed for a second time at processing elements 3 and 4. The first and second outputs of, respectively, processing elements 1 and 3 may be compared, and the first and second outputs of, respectively, processing elements 2 and 4 may be compared. A fault signal may be raised if either pairs of outputs do not match.

In another example, the graphics processing unit may comprise an odd number greater than two of processing elements. In these examples, the processing elements may be divided into two groups as described herein, with the remainder processing element being added to either the mission or safety group. In such situations, the remainder processing element will duplicate the work performed by one of the other processing elements in the group it is allocated to (even if the other processing elements in the group are not duplicating each other's work but are instead sharing the work of a larger task amongst themselves). In these examples, one or more three-way comparisons of outputs may be performed so as to take account of the output of the remainder processing element. For example, a graphics processing unit may comprise five processing elements labelled 1, 2, 3, 4 and 5. The mission group may comprise processing elements 1 and 2. The safety group may comprise processing elements 3, 4 and 5. The test task may be processed for a first time at processing elements 1 and 2. The test task may be processed for a second time at processing elements 3, 4 and 5. In this example, processing element 5 may be the 'remainder' processing element, whilst processing elements 3 and 4 share or duplicate the work of a task in the same way as processing elements 1 and 2. Processing element 5 may thus duplicate the work performed by processing element 4 (irrespective of whether processing element 4 is also duplicating the work of processing element 3, or doing different work to processing element 3). In this configuration, the outputs of processing elements 1 and 3 may be compared, and a fault signal raised if those outputs do not match. The outputs of processing elements 2, 4 and 5 may also be compared—and a fault signal may be raised if any one of those outputs do not match the other two. In this case, it would also be possible to determine which of processing elements 2, 4 and 5 have faulted. This is because the fault can be assumed to have occurred at the processing element whose signature does not match the signatures of the outputs from the two other processing elements. This is advantageous because it may allow the processing element with the fault to be turned off, whilst the overall graphics processing unit can still continue to duplicate and process the test task as has been described, using the remaining processing elements. In situations where all three of processing elements 2, 4 and 5 output different results it is not possible to distinguish which individual processing element is at fault (in the same way as for a comparison between two processing elements).

In a first example, the test task received in step S402 may be configured such that the processing of that test task by executing the predefined set of instructions for the predefined input data first and second times at the graphics processing unit as described herein uses y % of the logic on the graphics processing unit. In a second example, a plurality of predefined input data may be received with the test task received in step S402. In this example, the test task may be configured such that the processing of that test task by executing the predefined set of instructions for each of the plurality of predefined input data first and second times at the graphics processing unit cumulatively uses y % of the logic on the graphics processing unit. In a third example, step S402 may comprise receiving a predefined set of test tasks. Each test task may comprise a predefined set of instructions for execution on the graphics processing unit. Each predefined set of instructions may be configured to perform a predetermined set of operations on the graphics processing unit when executed for respective predefined input data. In this example, the predefined set of test tasks may be configured such that the processing of each test task of the predefined set of test tasks by executing the respective predefined set of instructions for the respective predefined input data first and second times at the graphics processing unit cumulatively uses y % of the logic on the graphics processing unit. In each of these examples, y may be greater than or equal to 90. This may be the percentage of the logic on a graphics processing unit to be verified such that that graphics processing unit 200 can be certified as meeting the ASIL B or ASIL D standards of ISO 26262.

As described herein, step S404 is performed in a test phase. There is also a non-test phase. The non-test phase is an operational phase in which the system performs tasks based on the normal use and operation of the system, as opposed to performing test tasks. One or more non-test tasks for processing at the graphics processing unit may be received. A non-test task may comprise a set of instructions defining a portion of work for the graphics processing unit to perform. That is, a non-test task may relate to the "normal" work of the graphics processing unit. As described herein, the work for the graphics processing unit to perform may comprise one or more of image processing, video processing, graphics processing and/or general processing. The work for the graphics processing unit to perform may be safety-critical work as described herein. A non-test task may be generated by a process executing at the processing system at which the graphics processing unit is implemented (e.g. one of processes 307 shown in FIG. 3), and received at the graphics processing unit for processing (e.g. by being written into graphics processing unit 200 via operating system 306 and memory 201).

In the non-test phase, each non-test task may be processed at the graphics processing unit a single time so as to generate a non-test output. That is, with reference to FIG. 2, a non-test task may be processed at either of processing elements PE1 204-1 or PE2 204-2, and the output of that processing unit may be output directly to memory (e.g. to local memory 206, to external memory 201 via local memory 206, or directly to external memory 201). In examples where the graphics processing unit comprises more than two processing elements, a test task may be processed a single time at just one of those processing elements (e.g. rather than being processed a single time by each processing element of the mission or safety group). In other words, the output data generated by processing a non-test task need not be provided to check unit 208.

It is possible to alternate between the test phase and the non-test phase. That is, the processing of test tasks and the comparison of their outputs can be performed periodically so as to verify that a graphics processing unit that is also processing non-test tasks (e.g. "normal" work) in the non-test phase is functioning correctly. The graphics processing unit may alternate between operating in the test phase and the non-test phase. That said, it is to be understood that a subset of the processing elements may operate in the test phase (e.g. processing test tasks), whilst other processing elements are operating in the non-test phase (e.g. processing non-test tasks). For example, referring to FIG. 2, if processing element 204-1 generates an output for the test task more quickly than processing element 204-2, that processing element 204-1 can enter the non-test phase so as to begin processing a non-test task whist the processing element 204-2 remains in the test phase processing a test task. Alternatively, in a graphic processing unit comprising more than two processing elements, some processing elements may enter the test phase whilst the others continue in the non-test phase. For example, with four processing elements, a first two processing elements may enter the test phase at a certain point in time whilst the other two processing elements continue in the non-test phase. When the first two elements complete the test phase, they may return to the non-test phase. At some other point in time, the other two processing elements may enter the test phase. The test phase of the other two processing elements may overlap with the test phase of the first two processing elements, but preferably it would not, so that the system is always processing some non-test phase work. As such, irrespective of the number of processing elements, there may be periods of time when some processing elements are in the test phase whilst others are not, and there may also be periods of time when all processing elements are in the non-test phase and/or all processing elements are in the test phase.

Figure 5:
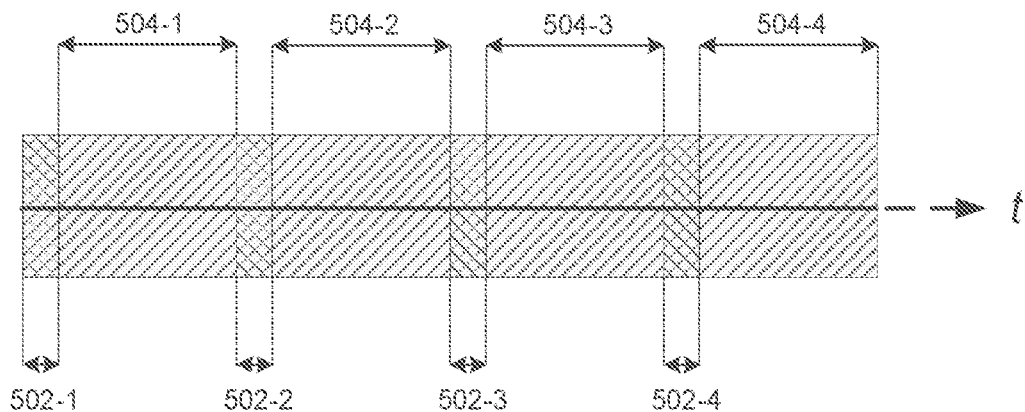
FIG. 5 is a schematic timeline showing the use of test and non-test phases.

FIG. 5 is a schematic timeline showing the use of test and non-test phases for a system such as that of FIG. 2, with a single pair of processing elements. The test phase 502 is shown using cross-hatching. The non-test phase 504 is shown using upward diagonal shading. As shown in FIG. 5, in a first period of time 502-1 the test phase is used, in a second period of time 504-1 the non-test phase is used, in a third period of time 502-2 the test phase is used, in a fourth period of time 504-2 the non-test phase is used, and so on.

When entering the test phase from the non-test phase (e.g. at the transition between the second period of time 504-1 and the third period of time 502-2), the processing of any non-test task(s) by the processing logic of the graphics processing logic may be paused (e.g. immediately paused). This is so that the processing of a test task in the test phase can begin (e.g. begin immediately). That is, on entering the test phase, the graphics processing unit may not wait for the processing of a non-test task to finish (e.g. reach a final output) before beginning processing of the test task. This can be achieved by assigning priority to the test task(s) received in step S402 such that, when the test phase is entered, that test task jumps to the front of the processing queue and is immediately read into the processing logic. That said, any progress made on processing non-test task(s) in the non-test phase need not be discarded when the test phase is entered. For example, when the test phase is entered, any intermediate data generated during the processing of a non-test tasks in the non-test phase can be written out of the processing logic to memory (e.g. local memory 206 and/or external memory 201). Preferably, said intermediate data would be written out to local memory (e.g. local memory 206) so that it can be read back into the processing logic more quickly when the non-test phase is re-entered. When re-entering the non-test phase from the test phase (e.g. at the transition between the third period of time 502-2 and the fourth period of time 504-2), processing of the paused non-test task can be resumed. That is, the intermediate data for that non-test task can be read back into the processing logic, and the processing logic can resume execution of the set of instructions comprised by the non-test task from the instruction that it had reached before processing was paused.

By contrast, on entering the non-test phase, the graphics processing unit may wait for the processing of the test task to finish (e.g. reach a final output) before beginning processing of a non-test task. That is, in practice, the duration of the test phase may be dictated by how much time it takes to complete processing of the test task. It is to be understood that the processing of non-test tasks by the processing logic in the non-test phase may begin whist the first and second outputs generated by processing a test task first and second times in the test phase are being compared (e.g. by check unit 208).

In this way, the periodic use of the test phase can be enforced by the processing system at which the graphics processing system is incorporated. That is, the processing system may periodically cause a test task to be written into the processing logic of the graphics processing unit for processing, the processing of that test task beginning as soon as it is read into the processing logic, and the processing of non-test tasks resuming only after the processing of the test task has completed. Alternatively, the graphics processing unit itself (e.g. firmware running at the graphics processing unit) may enforce the periodic use of the test phase.

In the examples described herein where step S402 comprises providing a predefined set of test tasks and/or a plurality of predefined input data, a different test task and/or predefined input data of those respective sets may be used each time the test phase is entered. In this way, different parts of the logic may be verified at different times, thus avoiding running all the tests in a single batch that causes a large interruption to the processing of non-test tasks.

The relative amount of time spent in each of the test phase and non-test phase shown in FIG. 5 is exemplary. Time may be divided differently between each phase. For example, the test and non-test phases may be used for equal amounts of time, or the test phase may even be used for more time than the non-test phase (e.g. in particularly safety-sensitive applications). It is also to be understood that, unlike as shown in FIG. 5, the test phase need not be used for the same amount of time each time it is entered, and/or that the non-test phase need not be used for the same amount of time each time it is entered.

The test phase may be operated in for x % of the time, and the non-test phase may be operated in for (100−x) % of the time. That is, for a period of time in which the test phase and the non-test phase are alternated between more than once, the test phase may be operated in for x % of that period of time and the non-test phase may be operated in for (100−x) % of that period of time. To give some examples, x may equal 2, 5, 10 or 20, or any other suitable number. For example, when x equals 10, the amount of time spent using the test phase before alternating to the non-test phase may be 10 milliseconds and the amount of time spent using the non-test phase before alternating back to the non-test phase may be 90 milliseconds, and so on.

Put another way, the test phase may be operated in for z % of the amount of time in which the non-test phase is operated in. To give some examples, z may equal 10, 15, 20 or 25, or any other suitable number. For example, when z equals 25, the amount of time spent using the test phase before alternating to the non-test phase may be 20 milliseconds and the amount of time spent using the non-test phase before alternating back to the non-test phase may be 80 milliseconds, and so on.

The relative amount of time spent in each of the test and non-test phases may be adaptive. That is, the values of x and/or z as descried herein may be adaptive.

In a first example, the values of x and/or z as described herein may be adaptive in dependence on the number of fault signals raised in a preceding period of time (e.g. the rate or frequency at which fault signals are being raised—e.g. by fault detection unit 210). As described herein, the processing system and/or the graphics processing unit may log fault signals so as to generate fault statistics such as these. For example, if the number of fault signals raised in a preceding period of time increases, the relative amount of time spent in the test phase (e.g. the values of x and/or z) may be increased, and visa versa. For example, the preceding period of time may be 1 second, 5 seconds, 10 seconds, or any other suitable time period. It is to be understood that increasing the relative amount of time spent in the test phase can be achieved by either increasing the amount of time spent in the test phase, or decreasing the amount of time spent in the non-test phase before re-entering the test phase.

In a second example, the values of x and/or z as described herein may be adaptive in dependence on an indicated safety-criticality of the non-test tasks to be processed by the graphics processing unit in the non-test phase. That is, the values of x and/or z as described herein may be adaptive in dependence on an indicated safety-criticality of the work to be performed by the graphics processing unit in the non-test phase. For example, as described herein, in the automotive context, advanced driver-assistance systems typically require a graphics processing unit that meets ASIL level B of ISO 26262, whilst autonomous vehicle systems typically require a graphics processing unit that meet the most stringent ASIL level D of ISO 26262. The safety-criticality of a portion of work associated with a non-test task may be indicated by the process generating that non-test task for processing (e.g. one of processes 307 shown in FIG. 3). For example, the relative amount of time spent in the test phase (e.g. the values of x and/or z) may be greater when the non-test tasks being received for processing in the non-test phase relate to autonomous vehicle systems than when the non-test tasks relate to advanced driver-assistance systems.

The processing of test tasks in the test phase as described herein is advantageous over processing an arbitrary non-test task (e.g. an arbitrary portion of "normal" work) first and second times in the test phase. This is because the test tasks as described herein comprise a predefined set of instructions for execution on the graphics processing unit, the predefined set of instructions being configured to perform a predetermined set of operations on the graphics processing unit when executed for predefined input data. That is, the test tasks as described herein can be specifically targeted (e.g. programmed) so as to guarantee that enough of the available logic on a graphics processing unit has been utilised in the test phase so as to satisfactorily verify that graphics processing unit. The same guarantees cannot be made for non-test tasks. This is because it is not known in advance what (or how much) logic on the graphics processing unit that an arbitrarily selected non-test task will be programmed to use.

Alternating between using a test phase to process test tasks first and second times for comparison and using a non-test phase to process non-test tasks a single time as described herein is also more efficient than continually processing all non-test tasks first and second times for comparison so as to verify a graphics processing unit. That is, by limiting the use of redundant processing to test tasks in a test phase, the overall non-test task throughput of a graphics processing unit can be greater than if no test phase existed and redundant processing were continually performed for all non-test tasks.

That said, in an example, if the number of fault signals raised in a preceding period of time exceeds a threshold, the graphics processing unit may also start to perform redundant processing of non-test tasks in the non-test phase. The threshold may be a numerical threshold, a fault rate or fault frequency threshold, or any other suitable threshold. When said threshold is exceeded, the graphics processing unit may begin processing each non-test task, in the non-test phase, first and second times so as to, respectively, generate first and second non-test outputs. A fault signal can be raised if the first and second non-test outputs do not match. It can be checked whether the first and second non-test outputs match by using any of the techniques described herein with reference to check unit 208. The graphics processing unit may continue to perform redundant processing of non-test tasks in the non-test phase in this way until the number of fault signals raised in a preceding period of time falls below a threshold (e.g. the same threshold as used to trigger redundant processing in the non-test phase, or a second, lower, threshold). Such a situation may occur, for example, when one or more random errors trigger the threshold. Such errors would not be expected to occur in the same way in new tasks that are processed (as opposed to newly occurring systematic errors, which would continue to affect new test and non-test tasks in the same way).

In this example, all non-test tasks may be scheduled for redundant processing in the non-test phase when the number of fault signals raised in a preceding period of time exceeds a threshold. Alternatively, only those non-test tasks that are indicated to relate to safety-critical work may be redundantly processed in the non-test phase. For example, a graphics processing unit may be used to perform the tile-based rendering of a heads-up display for a vehicle. A subset of the tiles of that display may be used to relay safety-critical information to the driver (e.g. the current speed of the vehicle), whilst other tiles of that display may relay non-safety critical information (e.g. a selected radio station). In this case, non-test tasks relating to those safety critical tiles may be redundantly processed in the non-test phase, whilst non-test tasks relating to non-safety critical tiles may be processed a single time in the non-test phase.

In a modified example, redundantly processing non-test tasks in the non-test phase may further comprise writing out the first non-test output to a memory (e.g. local memory 206, or external memory 201), reading back the first non-test output from the memory, and raising a fault signal if the first non-test output as read back from the memory and the second non-test output do not match. It can be checked whether the first non-test output as read back from the memory and the second non-test output match by using any of the techniques described herein with reference to check unit 208. That is, the first non-test output may be read into the check unit 208 from the memory to which it was written, whilst the second non-test output may be received at the check unit 208 directly from the processing logic at which it was processed. In this modified example, faults introduced at the memory, or on the data path to/from the memory can be identified, as well as faults introduced during processing.

In another example, the implementation of other safety process for the graphic processing unit can depend on the number of fault signals raised in a preceding period of time. For example, a plurality of resets of the graphics processing unit may be scheduled in accordance with a reset frequency. A reset of the graphics processing unit can be enforced by the processing system at which the graphics processing unit is incorporated (e.g. processing system 300 shown in FIG. 3). That is, the processing system 300 may cause the plurality of resets of the graphics processing unit to be performed commensurate with the reset frequency. It is to be understood that the graphics processing unit may wait for the processing of a task that has already begun to be completed before the reset occurs. Therefore, there may be a slight discrepancy between the scheduled reset frequency and the frequency with which resets actually occur. Transient faults—such as those caused by random bit-flipping in the logic of a graphics processing unit as a result of by ionizing radiation, voltage spikes, or electromagnetic pulses—can be eliminated by causing the graphics processing unit to be reset. The reset frequency may be dependent on the number of fault signals raised in a preceding period of time. For example, if a large number of fault signals are raised in a preceding period of time, the reset frequency may be increased, and visa versa.

The graphics processing unit of FIG. 2 and the processing system of FIG. 3 are shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

A graphics processing unit as described herein may be embodied in hardware on an integrated circuit. A graphics processing unit as described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, a graphics processing unit as described herein. Furthermore, there may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 6.

Figure 6:
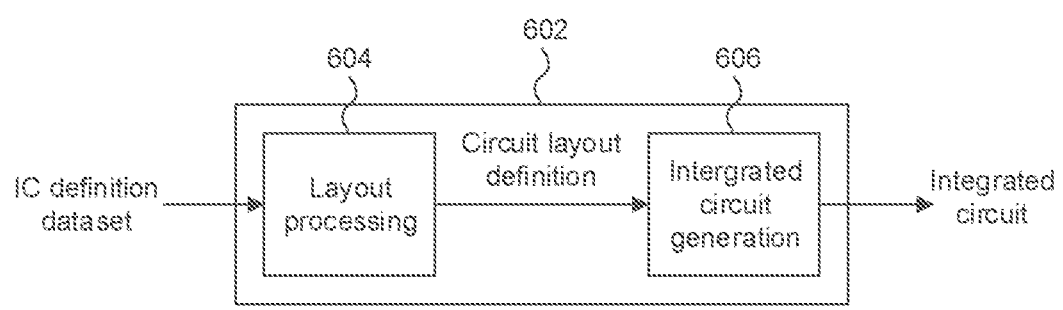
FIG. 6 shows an integrated circuit manufacturing system for generating an integrated circuit embodying a graphics processing unit.

FIG. 6 shows an example of an integrated circuit (IC) manufacturing system 602 which is configured to manufacture a graphics processing unit as described in any of the examples herein. In particular, the IC manufacturing system 602 comprises a layout processing system 604 and an integrated circuit generation system 606. The IC manufacturing system 602 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 602 to manufacture an integrated circuit embodying a graphics processing unit as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a graphics processing unit as described herein. For example, the configuration of an integrated circuit manufacturing system in the manner described above with respect to FIG. 6 by an integrated circuit manufacturing definition dataset may cause a graphics processing unit as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of verifying processing logic of a graphics processing unit, the method comprising:
   receiving a test task at the graphics processing unit, the test task comprising a predefined set of instructions for execution on the graphics processing unit, the predefined set of instructions being configured to perform a predetermined set of operations on the graphics processing unit when executed for predefined input data;
   in a test phase, processing the test task by executing the predefined set of instructions for the predefined input data first and second times at the graphics processing unit so as to respectively generate first and second outputs;
   raising a fault signal if the first and second outputs do not match;
   receiving one or more non-test tasks for processing at the graphics processing unit;
   in a non-test phase, processing each of the one or more non-test tasks at the graphics processing unit a single time so as to generate a non-test output; and
   for a period of time in which the test phase and the non-test phase are alternated between more than once, operating in the test phase for x % of the time, and operating in the non-test phase for (100−x) % of the time;
   wherein x is adaptive in dependence on:
      a rate at which fault signals are being raised; and/or
      an indicated safety-criticality of the non-test tasks to be processed by the graphics processing unit in the non-test phase.

2. The method of claim 1, wherein the predefined set of instructions are configured to perform a different predetermined set of operations on the graphics processing unit when executed for different predefined input data.

3. The method of claim 1, wherein the graphics processing unit comprises a plurality of processing elements, and the method comprises processing the test task first and second times, respectively, at different processing elements of the graphics processing unit.

4. The method of claim 1, wherein raising a fault signal if the first and second outputs do not match comprises:
   forming first and second signatures which are characteristic of, respectively, the first and second outputs;
   comparing the first and second signatures; and
   raising a fault signal if the first and second signatures do not match.

5. The method of claim 1, wherein the method does not comprise receiving a predetermined expected output of the test task.

6. The method of claim 1, wherein each non-test task comprises a set of instructions defining a portion of work for the graphics processing unit to perform, optionally wherein the work for the graphics processing unit to perform comprises one or more of image processing, video processing, graphics processing and/or general processing.

7. The method of claim 6, wherein the work for the graphics processing unit to perform is safety-critical work.

8. The method of claim 1, further comprising:
   when entering the test phase from the non-test phase, pausing processing of a non-test task so that the processing of the test task can begin; and
   when re-entering the non-test phase from the test phase, resuming processing of the paused non-test task.

9. The method of claim 1, further comprising, if the number of fault signals raised in a preceding period of time exceeds a threshold:
   in the non-test phase, processing a non-test task first and second times at the graphics processing unit so as to, respectively, generate first and second non-test outputs; and raising a fault signal if the first and second non-test outputs do not match.

10. The method of claim 1, wherein the test task is configured such that the processing of that test task by executing the predefined set of instructions for the predefined input data first and second times at the graphics processing unit uses y % of the logic on the graphics processing unit, wherein y is greater than or equal to 90.

11. The method of claim 1, further comprising:
receiving a plurality of predefined input data; and
wherein the test task is configured such that the processing of that test task by executing the predefined set of instructions for each of the plurality of predefined input data first and second times at the graphics processing unit cumulatively uses y % of the logic on the graphics processing unit, wherein y is greater than or equal to 90.

12. The method of claim 1, further comprising:
receiving a predefined set of test tasks, each test task comprising a predefined set of instructions for execution on the graphics processing unit, the predefined set of instructions being configured to perform a predetermined set of operations on the graphics processing unit when executed for predefined input data; and
wherein the predefined set of test tasks is configured such that the processing of each test task of the predefined set of test tasks by executing the respective predefined set of instructions for the respective predefined input data first and second times at the graphics processing unit cumulatively uses y % of the logic on the graphics processing unit, wherein y is greater than or equal to 90.

13. The method of claim 1, further comprising:
scheduling a plurality of resets of the graphics processing unit in accordance with a reset frequency; and
causing the plurality of resets of the graphics processing unit to be performed commensurate with the reset frequency;
wherein the reset frequency is dependent on the number of fault signals raised in a preceding period of time.

14. A graphics processing unit configured to receive a test task comprising a predefined set of instructions for execution on the graphics processing unit, the predefined set of instructions being configured to perform a predetermined set of operations on the graphics processing unit when executed for predefined input data, the graphics processing unit comprising:
processing logic being configured to, in a test phase, process the test task by executing the predefined set of instructions for the predefined input data first and second times at the graphics processing unit so as to, respectively, generate first and second outputs;
a check unit being configured to raise a fault signal if the first and second outputs do not match;
the graphics processing unit being further configured to receive one or more non-test tasks for processing at the graphics processing unit;
the processing logic being configured to, in a non-test phase, process each of the one or more non-test tasks at the graphics processing unit a single time so as to generate a non-test output; and
for a period of time in which the test phase and the non-test phase are alternated between more than once, the processing logic being configured to operate in the test phase for x % of the time, and operate in the non-test phase for (100−x) % of the time;
wherein x is adaptive in dependence on:
a rate at which fault signals are being raised; and/or
an indicated safety-criticality of the non-test tasks to be processed by the graphics processing unit in the non-test phase.

15. A non-transitory computer readable storage medium having stored thereon computer readable instructions that, when executed at a computer system, cause the computer system to perform a method of verifying processing logic of a graphics processing unit, the method comprising:
receiving a test task at the graphics processing unit, the test task comprising a predefined set of instructions for execution on the graphics processing unit, the predefined set of instructions being configured to perform a predetermined set of operations on the graphics processing unit when executed for predefined input data;
in a test phase, processing the test task by executing the predefined set of instructions for the predefined input data first and second times at the graphics processing unit so as to, respectively, generate first and second outputs;
raising a fault signal if the first and second outputs do not match;
receiving one or more non-test tasks for processing at the graphics processing unit;
in a non-test phase, processing each of the one or more non-test tasks at the graphics processing unit a single time so as to generate a non-test output; and
for a period of time in which the test phase and the non-test phase are alternated between more than once, operating in the test phase for x % of the time, and operating in the non-test phase for (100−x) % of the time;
wherein x is adaptive in dependence on:
a rate at which fault signals are being raised; and/or
an indicated safety-criticality of the non-test tasks to be processed by the graphics processing unit in the non-test phase.

* * * * *